Sept. 17, 1963        R. L. PIERCE        3,104,117
STABILIZING ATTACHMENT FOR VEHICLE FRONT SUSPENSIONS
Filed May 1, 1961        2 Sheets-Sheet 1
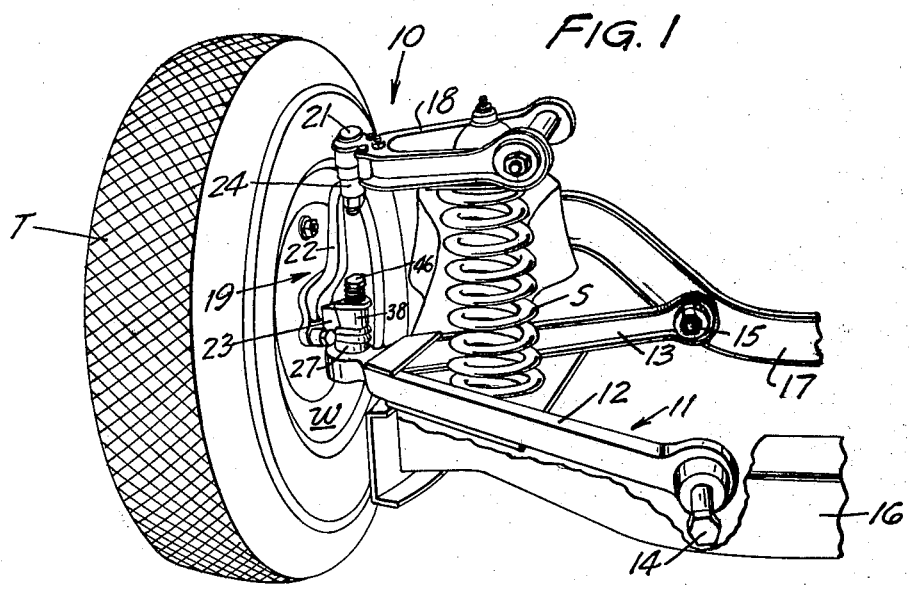
INVENTOR
RAYMOND L. PIERCE
BY
*Williamson & Palmatier*
ATTORNEYS

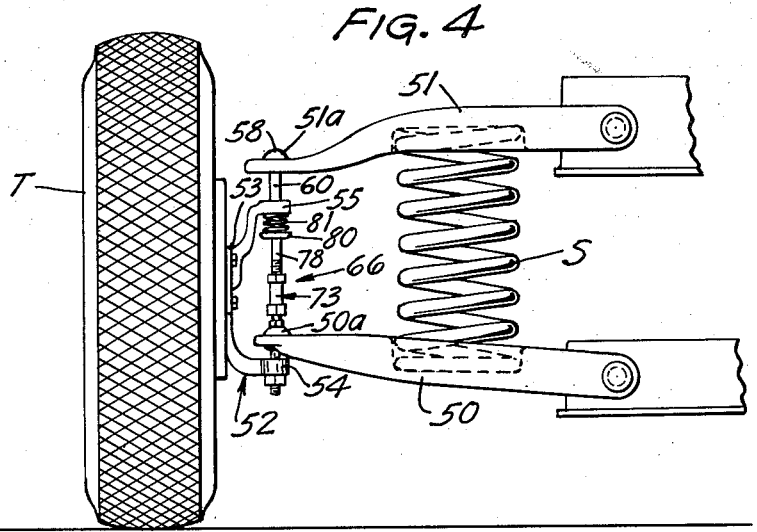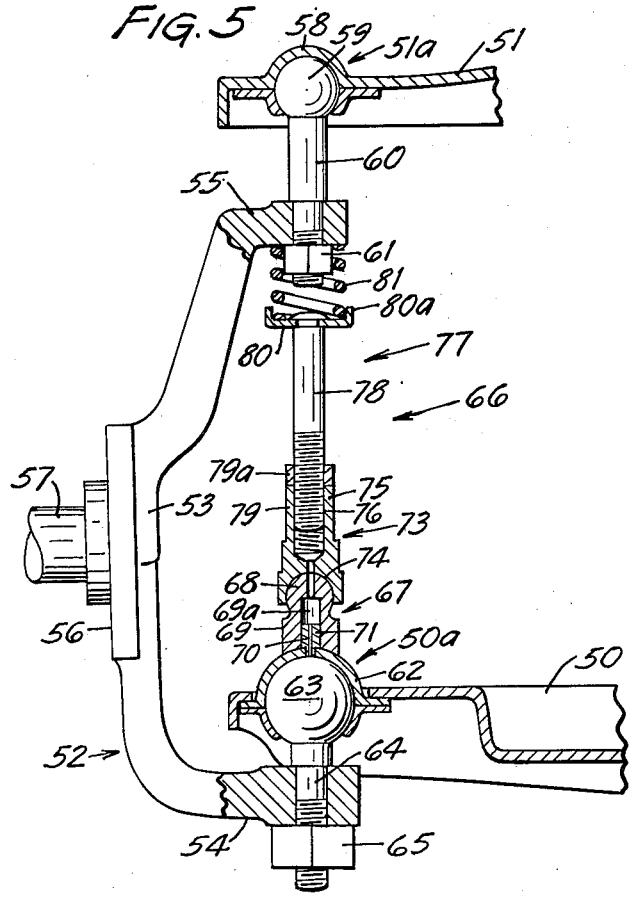

United States Patent Office 3,104,117
Patented Sept. 17, 1963

3,104,117
STABILIZING ATTACHMENT FOR VEHICLE FRONT SUSPENSIONS
Raymond L. Pierce, Rte. 2, Mound, Minn.
Filed May 1, 1961, Ser. No. 106,981
5 Claims. (Cl. 280—96.2)

This invention relates to stabilizing attachments for use in stabilizing the front end ball joint suspensions of automotive vehicles.

Various makes of automotive vehicles employ ball joint type front end suspensions. In front end suspensions of this type a ball and socket joint interconnects the upper and lower suspension arms with the front wheel spindle assembly. If the snug fitting relation of the ball within the socket is impaired as a result of wear or the like, the ball will become somewhat loosely disposed within the socket. Loose ball joint in front end suspensions not only create annoying noises but this condition also results in improper steering. The wobbly movement of the front tires creates a condition known as "road wandering" as well as causing uneven wear of the front tires of the automobile.

My invention is directed towards overcoming these problems.

It is, therefore, a general object of this invention to provide a novel stabilizing attachment, of simple and inexpensive construction, for use in stabilizing the front end ball joint suspensions of automotive vehicles.

Another object of this invention is to provide a novel and improved stabilizing attachment for use with ball joint front end suspensions of automotive vehicles and including means for exerting tension on the ball joint to thereby constantly urge the ball and socket thereof into snug fitting relation.

A more specific object of this invention is to provide a novel and improved stabilizing attachment for use in applying tension to the lower ball joint of the ball joint front end suspension for automotive vehicles, the attachment being readily attachable to the front end suspensions for detachment therefrom without necessitating extensive alteration of the vehicle.

Another object of this invention is the provision of a novel and improved stabilizing attachment which serves to constantly apply tension to the lower ball joint of front end suspensions of automotive vehicles and the like, and which thereby serves to eliminate steering problems, tire wear and annoying noises attributable to loose ball joints.

These and other objects and advantages of my invention will more fully appear from the following descriptions made in connection with the accompanying drawings wherein like character references refer to the same or similar parts throughout the several views, and in which:

FIG. 1 is a front perspective view of a ball joint type suspension of automotive vehicles incorporating one embodiment of my invention;

FIG. 2 is a vertical section on an enlarged scale of the embodiment of my invention as shown in FIG. 1;

FIG. 3 is an exploded perspective view of the stabilizer attachment illustrating the details thereof;

FIG. 4 is a front elevational view of a front end ball joint suspension of an automobile incorporating another embodiment of my invention; and FIG. 5 is a vertical section on an enlarged scale of the embodiment of my invention illustrated in FIG. 4.

Referring now to the drawings and more specifically to FIGS. 1 to 3, it will be seen that one embodiment of my invention is illustrated in cooperating relation for the purpose of stabilizing a conventional front end suspension of an automotive vehicle, the front end suspension being designated in general by the reference numeral 10. The front end suspension 10 includes a lower control arm or frame 11 of general A-shaped configuration and which includes a front frame element 12 and a rear frame element 13 rigidly interconnected. The front frame element is pivotally connected by means of conventional pivot bolt 14 to the frame member 16 and a rear frame element 13 is pivotally connected to the car frame member 17 by means of a pivot bolt 15 to permit relative pivoting movement between the relative control arm and the automobile frame.

The front end suspension 10 also includes an upper control arm 18 also pivotally connected to the automobile frame (not shown), the upper control arm being spaced substantially above the lower control arm 11. Referring again to FIG. 1, it will be noted that the lower control arm 11 and upper control arm 18 are interconnected to the front wheel spindle assembly 19 by means of lower ball joint 20 and upper ball joint 21, respectively. A heavy coil spring S extends between the upper and lower control arms respectively and cooperates with the control arms and the front wheel spindle assembly 19 to define the conventional parallelogram suspension for the front end of the automotive vehicle.

The front wheel spindle assembly 19 includes a vertically disposed support member 22 having a laterally extending lower attachment portion or arm 23 and an upper attachment portion or arm 24, the arms being vertically spaced apart and being disposed in substantially parallel relation. The wheel spindle assembly 19 also includes a plate 25 having the wheel shaft or spindle 26 projecting laterally therefrom to permit a wheel W to be journaled thereon, the wheel W being provided with the conventional pneumatic tire T.

The lower ball joint 20, as best seen in FIG. 2, includes a ball and socket connection, the socket being comprised of a socket portion 27 rigidly attached to the lower control arm 11 and also is comprised of a cup-shaped sealing member 28 rigidly attached to the upper socket portion 27. It will be noted that the cup-shaped sealing member 28 is provided with a depending fitting 29 to facilitate lubrication of the hollow interior defined by the seal member and socket portion, the interior suitably receiving a conventional ball structure 32 which is held against the socket 27 by means of bolt 30 having a tapered vertically extending shank 31 extending upwardly therefrom and through a suitable aperture formed in the lower attachment arm 23 of the wheel spindle assembly 19.

Ball structure 32 includes a semi-spherical upper ball portion 33 and an annular lower ball portion 33a, the latter being a ball bearing. The ball structures are positioned within the interior of the socket and are disposed in bearing engagement with the socket portion 27 by the bolt 30. The socket portion 27 is provided with an outer dome-shaped element or shim 34. It will be noted that the upper terminal portion of the shank 31 is threaded as at 31a and an annular compressible element 35 is interposed between the lower attachment arm 23 of the wheel spindle assembly 19 and the upper exterior of the upper socket portion 27 which prevents excessive wear of metal against metal and which serves to seal the interior of the socket of the ball joint.

Ordinarily the ball joint is secured in interconnecting relation with respect to the lower control arm and the front wheel spindle assembly by means of lock nut which threadedly engages the upper terminal portion of the shank 31. However, as pointed out above this ball joint not only creates hazardous conditions but also necessitates repeated placement of the worn ball joints. In order to overcome these problems, I have provided a novel stabilizing attachment designated generally by the reference numeral 36 and which includes a ball-joint engaging mechanism 37 which engages the upper exterior surface of the upper socket portion 27 and extends upwardly therefrom. This ball-engaging mechanism 37 includes a generally vertically disposed ball joint engaging member 38 of substantially channel shaped configuration. It will be noted that the channel shaped member 38 terminates at its lower end in an arcuate lower peripheral edge 38a which engages an annular surface area of the upper socket portion 27. The channel-shaped member 38 terminates upwardly in an arcuate upper peripheral edge 38b and is provided with an arcuate groove 39 disposed closely adjacent the lower peripheral edge 38a. The channel shaped configuration of the member 38 permits the member to be positioned around the laterally projecting lower attachment arm 23 of the wheel spindle assembly 19 and also permits effective and uniform bearing engagement of the member against the lower ball joint 20.

The ball-engaging mechanism 37 also includes a substantially flat bearing plate 40 provided with an annular depending flange 41, the plate being provided with a centrally located aperture 42 to permit the passage of the ball shank 31 therethrough. This bearing plate 40 is positioned upon the upper arcuate peripheral edge 38b of the channel shaped member 38 as best seen in FIG. 2. Means are provided for exerting force downwardly through the ball-engaging mechanism 37 for applying tension to the lower ball joint 20 and this means includes a tensioning mechanism 43 which, as best seen in FIG. 2, includes a tensioning member 44. This tensioning member 44 is provided with a threaded bore 45 which serves to threadedly engage the upper terminal threaded portion 31a of the shank 31. The upper terminal portion of the tensioning member 44 is provided with an annular flange 46 and a resilient element in the form of a coil spring 47 is interposed between the bearing plate 40 and the annular flange 46 so that adjustment of the tensioning member 44 upon the threaded shank 31 permits the spring tension to be readily varied. The spring 47 when compressed by adjustment of the tensioning member 44 imparts tension to the lower ball joint 28 through the ball joint engaging mechanism 37 thus constantly urging the ball and socket of the ball joint into snug fitting relation. Since the ball-joint engaging mechanism 37 is being constantly urged downwardly by action of the spring member 47, the ball and socket joint will be also constantly urged into snug fitting relation thus my stabilizing attachment actually functions as a self tightening means for ball and socket joints.

It has been found that loose ball joints, that is ball joints wherein wear has resulted in play and looseness between the ball and socket of the ball joint interferes noticeably with the steering of the automobile since the wheels will not respond as effectively to steering maneuvers. It has also been found that because of the wobbling effect of the wheels with regard to the frame necessitates numerous front wheel alignments and also results in uneven and excessive tire wear. Loose ball joints also create annoying noises and the impact between the loose parts of the ball joint causes more rapid breakdown of the ball joint. It has been found though through the use of my stabilizing attachment that the undesirable results attributable to loose ball joints are greatly precluded if not completely eliminated.

It has also been found that my stabilizing apparatus because of its self tightening function with regard to the ball joint precludes the constant need of replacing or adjusting the ball joint. It will be seen from the drawing and the above description that my novel stabilizing attachment can be readily installed in most automobiles without necessitating extensive alteration to the front end suspensions of the automobiles. It should be pointed out that the particular embodiment illustrated in FIGS. 1 to 3 is especially adaptable to those automobiles in which the frame of the automobile is suspended from the front wheel spindle assembly.

Referring now to FIG. 1, it will be seen that the lower control arm 11 is positioned below and suspended from the front wheel spindle assembly 19 and this arrangement is that which is found in the later model Ford products.

Referring now to FIGS. 4 and 5, it will be seen that another embodiment of my invention is shown incorporated in the front end of an automotive vehicle having a ball joint suspension system, the latter being of slightly different construction than that illustrated in FIGS. 1 to 3. It will be seen that the front end suspension illustrated in FIGS. 4 to 5 includes a lower suspension control arm 50 and an upper control arm 51 disposed in vertically spaced apart relation and each being connected to the front wheel spindle assembly 52 by means of a lower ball joint 50a and an upper ball joint 51a. A heavy coil spring S is interposed between the upper and lower control arms in cooperating relation with the latter and with the wheel spindle assembly to define a parallelogram linkage of the type illustrated in FIGS. 1 to 3.

Referring now to FIG. 5, it will be seen that wheel assembly 52 includes a vertically disposed support member 53 having a laterally extending lower attachment arm 54 and an upper attachment arm 55. Each of these attachment arms are suitably apertured and are vertically spaced apart in substantially parallel relation much in the manner of the wheel spindle assembly illustrated in FIGS. 1 to 3. The wheel spindle assembly 52 also includes a plate 56 having a laterally projecting spindle 57 extending therefrom and which serves to provide a mount for the tire mounted wheel for the automotive vehicle. It will be noted that the lower suspension control arm 50 of the front end suspension illustrated in FIG. 4 is disposed upon its associated lower attachment arm 54 of the wheel spindle member 52 and is not suspended from the wheel spindle assembly as is the front end suspension illustrated in FIGS. 1 to 3. This arrangement is that generally found in the later model General Motors products.

Referring again to FIG. 5, it will be seen that the upper ball joint 51a includes a socket 58 rigidly attached with the upper control arm 51 having a hollow interior in which is positioned a ball 59 the latter having a threaded depending shank 60 which extends through the apertured upper attachment arm 55 of the wheel spindle assembly 52. The nut 61 suitably secures the lower end of the threaded shank to the wheel spindle assembly 52.

Lower ball joint 50a, as best seen in FIG. 5, includes a socket 62 rigidly fixed with the lower control arm 50 and is provided with a ball 63 positioned therein, the latter having a depending shank 64 threaded adjacent its lower terminal portion and which extends through the apertured lower attachment arm 54 and is secured in fixed relation therewith by means of a lock nut 65.

The stabilizing attachment designated in its entirety by the reference numeral 66 includes a ball-engaging mechanism 67 which includes a ball portion 68 integrally affixed to a base portion 69, the latter being provided with a recess 69a therein. The lower ball joint 50a is provided with a bolt 70 which threadedly engages an embossed portion on the socket 62, the bolt 70 having an enlarged head 71. It will be noted that this bolt has an axially disposed passage therethrough which serves to permit lubrication of the interior of the ball joint 50a. It will be noted that the recess base portion 69 is positioned over the head 71 of the bolt 70 and that the ball member 68 is disposed above said ball joint 50a. The ball engaging mechanism 67 also includes a socket member 73 which, as best seen in FIG. 5, has a ball or dome-shaped recess 74 therein, in which is disposed the ball portion 72 of the ball member 68. The socket member 73 is also provided with an upstanding portion 75 having a threaded axial bore 76 therein.

The stabilizing attachment 66 also includes a tensioning mechanism 77 comprised of an elongate tensioning member 78 having a threaded terminal portion 79. This threaded terminal portion 79 is adapted to threadedly engage the threaded axial bore 76. The opposite terminal portion of the tensioning member 78 is provided with an enlarged, substantially flat head 80 having upturned annular flange 80a. The resilient member 81 in the form of a coil spring is interposed between the upper terminal portion of the tensioning member 78 and the lower surface of the upper attachment arm 55 of the wheel spindle assembly 52. Thus, it will be seen that the tensioning member 78 may be adjusted relative to the ball joint engaging mechanism 67 thus providing the tension exerted on the ball joint 53 to be readily varied.

A lock nut 79a is adapted to threadedly engage the shank portion of the tensioning member 78 and to be positioned against the socket member 73 on the ball engaging mechanism 67 thus retaining the tensioning member in its adjusted position. It will be noted that resilient spring 81 and tension member 78 cooperate with each other to impart a downward force against the lower ball joint 53 through the means of the ball-engaging mechanism 67. Thus the ball and socket of the lower ball joint 53 are constantly urged into snug fitting relation. The unique construction of the ball and socket elements of the ball-engaging mechanism 67 in no way interfere with the universal pivoting action of the lower ball joint 53. Thus, it will be seen that the stabilizing attachment 66 serves to constantly impart tension to the lower ball joint 53 thus insuring the snug-fitting relation of the ball and socket comprising the ball joint.

It will therefore be seen from the preceding paragraphs that I have provided a novel stabilizing attachment readily detachable to conventional front end ball joint suspensions for assuring snug fitting relation of the ball and socket element of the conventional lower ball joint of the suspension structure.

It will be noted from the foregoing description that with my unique attachment the problems commonly associated with loose ball joints, to wit, annoying noises, improper steering, undue tire wear and constant replacement of the ball joint are greatly reduced if not eliminated.

Thus, it will be seen from the foregoing description that I have provided a novel stabilizing attachment which while being of simple and inexpensive construction functions in a more efficient manner than any heretofore known comparable devices.

It will, of course, be understood that various changes may be made in the form, details, and arrangement of the various parts without departing from the scope of my invention.

What is claimed is:

1. Stabilizing attachment for use in stabilizing the front end ball joint suspensions of conventional automobile vehicles having a conventional ball and socket connection between the front wheel spindle assembly and the lower suspension arm, said stabilizing attachment including a ball-joint engaging mechanism including cooperating ball and socket elements adapted to be disposed in engaging relation with the upper surface of the conventional lower front end ball joint of an automotive vehicle and extending upwardly therefrom, an adjustable tensioning mechanism for exerting tension downwardly against said ball-joint engaging mechanism and including an elongate tensioning member adjustably connected with one of said ball and socket elements and being adjustable relative thereto, and a resilient element engageable with the front wheel spindle assembly and bearing against said tensioning member and cooperating with the latter during adjustment thereof for exerting downward tension through said ball and socket elements to the ball joint of the front end suspension to constantly urge the ball and socket of the ball joint into snug fitting relation.

2. The structure as defined in claim 1 wherein the socket element of said ball-engaging mechanism is provided with a threaded recess and is threadedly engaged by said elongate tensioning member for adjustment relative thereto to permit the tension exerted against the ball and socket of the lower front end ball joint to be variously adjusted.

3. The structure as defined in claim 1 wherein said resilient element comprises a coil spring bearing against the uppermost end of said tensioning member and adapted to engage the front wheel spindle assembly.

4. Stabilizing attachment for use in stabilizing a front end ball joint suspension of conventional automotive vehicles and having a ball and socket connection between front wheel spindle assembly and the lower suspension arm, said stabilizing attachment comprising a ball-joint engaging mechanism engageable with the lower front end ball joint of a vehicle and including a rigid ball element, a rigid socket element receiving said ball element therein for relative universal movement therebetween, one of said ball and socket elements being connectible with the upper surface of the conventional lower front ball joint of a conventional vehicle for ready detachment therefrom, the other of said ball and socket elements having a vertically disposed, upwardly opening threaded socket therein, an elongate threaded tensioning member threadedly engaging said socket and being axially adjustable relative thereto, and a coil spring element engageable with the front wheel spindle assembly and bearing against the upper terminal portion of said tensioning member and cooperating with the latter during axial adjustment thereof for exerting downward tension through said ball and socket elements to the ball joint of the front end suspension to constantly urge the ball and socket of the front end ball joint in snug-fitting relation.

5. The structure as defined in claim 4 wherein said ball element is detachably connected to the front end lower ball joint.

References Cited in the file of this patent

UNITED STATES PATENTS

| | | |
|---|---|---|
| 891,139 | Borneman | June 16, 1908 |
| 2,261,254 | Humphrey | Nov. 4, 1941 |
| 2,444,658 | Lucas | July 6, 1948 |
| 2,822,185 | Mineck | Feb. 4, 1958 |

FOREIGN PATENTS

| | | |
|---|---|---|
| 825,160 | Great Britain | Dec. 9, 1959 |